United States Patent Office 3,786,037
Patented Jan. 15, 1974

3,786,037
PROCESS FOR DECREASING ETHYLENIC POLY-UNSATURATION IN ORGANIC CARBOXYLIC ACIDS USING A CO-CATALYST
Arthur Waldemar Krause, Gulf Breeze, and Malcolm Edward Hannah, Pensacola, Fla., assignors to Reichhold Chemicals, Inc., White Plains, N.Y.
No Drawing. Filed July 23, 1971, Ser. No. 165,577
Int. Cl. C09f 7/00
U.S. Cl. 260—97.5                        21 Claims

ABSTRACT OF THE DISCLOSURE

This invention provides a process for decreasing the ethylenic polyunsaturation by reacting polyunsaturated aliphatic acid compounds or diunsaturated cycloaliphatic acid compounds in the presence of iodine disproportionation catalyst and a metal compound activator.

---

The treatment of natural resinous products, specifically those containing rosin acid, and of natural and synthetic fatty acids has long been carried out using catalysts such as iodine, sulphur, sulfur dioxide, platinum or palladium black, selenium, nickel metal and other materials to obtain more useful and more stable products for use in industry. This disproportionation treatment of the rosin acids present in these natural resious products converted the ethylenic diunsaturated carboxylic acids present, such as abietic acids and its related structural isomers, to mixtures of the more stable and useful saturated acids, e.g. tetrahydroabietic acid, monounsaturated dihydroabietic acid and the aromatic dehydroabietic acids. Such disproportionation treatment usually also results in some polymerization of the original unsaturates to form a higher molecular weight and more stable material.

A similar process is carried out on unsaturated fatty acids, i.e. generally aliphatic acids, and other polyunsaturated aliphatic acids, such as are obtained from vegetable and animal oils. Generally these materials include unsaturated acids, such as oleic, linoleic acids, and arachidonic acid. Under similar conditions, including the catalyst, as are applied to the cycloaliphatic rosin acids, the fatty acids undergo a somewhat different series of reactions, including dimerization and hydrogenation of the polyunsaturates. The molecules which dimerize release hydrogen which is used to hydrogenate the other molecules. This tends to increase the stability of the material. The prior art generally found that mixtures of rosin acids or other cycloaliphatic acids, and adiphatic unsaturated fatty acids were difficult to disproportionate or modify without an undesirable chemical change in the acids which results in a product which did not have desirable properties.

Generally, the reaction of the aliphatic acids and the cycloaliphatic acids are slightly different. This is believed to be due to the formation of the stable aromatic acids by the dehydrogenation of the cycloaliphatic acids, e.g. abietic acid; the aliphatic diunsaturated acids have a greater tendency to polymerize upon isomerization.

The processes for carying out such treatments, or disproportionation, are described for example, in U.S. Pats. Nos. 3,157,629 to Patrick and 3,277,072 to Patrick et al., for fatty acids and rosin acids respectively.

The use of two different catalysts is described in British patent specification No. 1,021,757. The patentee points out however that the simultaneous use of two different catalysts is undesirable as it results in the formation of an undesirable nondecolorizable, black gum. However when iodine and sulphur are used consecutively rather than simultaneously, i.e., "hydrodehydrogenation reactions" involving abietic acid are carried out by sequentially using iodine and sulphur as catalysts, a uniform product is obtained regardless of the source of the resin aid feed, e.g. from wood rosin or from tall oil.

An unrelated type of treatment for rosin has involved the application of large amounts of metal compounds, generally in order to reduce the acid number value of the resin. Such treatments have used from 10% to about 30% by weight of metal salt in the rosin acid and resulted in the change of acid number in part, at least, due to decarboxylation of the resin acids at the temperatures employed. For example, see U.S. Pat. Nos. 2,311,200 to Auer and 2,293,038 also to Auer. This latter type of treatment, however, is not relevant to treatments where the desired product contains the greatest possible yield of dehydroabietic acid by a disproportionation reaction.

In accordance with the present invention, a process is provided for reducing the proportion of ethylenic polyunsaturation in aliphatic and cycloaliphatic carboxylic acid compounds to a greaer degree and in a shorter time than previously obtainable and without the application of pressure. The present invention provides a process for changing the degree of unsaturation of an aliphatic acid or a cycloaliphatic acid, without decarboxylating or otherwise degrading the material, by heating the polyunsaturated acids in the presence of preferably iodine, as the disproportionation catalyst, and a metal compound co-catalyst, or activator.

The process of the present invention can be carried out in either an open or closed reaction vessel and under either batch or continuous conditions. The temperature of the reaction is generally from about 175° C. up to about 300° C. Below 175° C., although some amount of reaction can occur, reaction rate is so slow even with the combined catalyst of the present invention as to be generally uneconomic. Above 300° C., decarboxylation can occur, thus decreasing the acid quality of the product. The preferred temperature range is from about 190° to about 275° C. a range within which a satisfactory reaction rate occurs without any substantial decarboxylation of the acid compounds.

The reaction can be carried out in a closed or open vessel because pressure has substantially no direct effect on the present reaction.

The components of the reaction mixture, including the ethylenically polyunsaturated carboxylic acid compounds and other materials mixed therewith, to be treated, the catalyst and co-catalyst are mixed in the reaction vessel; alternatively, premixing of two or more of the components can occur with the final mixing occurring in the reaction vessel. For example, the activator can be premixed with either the catalyst or with the polyunsaturated acid. In a continuous reaction process, the feed and effluent is balanced so as to maintain a constant desired concentration of reagent and product in the reaction zone.

The present process is applicable to aliphatic polyunsaturated carboxylic acids and cyclo-aliphatic diunsaturated carboxylic acids and mixtures containing such acids. An advantage of the present process is that it is applicable to both the conjugated and the nonconjugated diunsaturated acids. The other ingredients which can be present in the reaction feed material include other acids and esters; generally any compound which does not interfere with the present reaction can be present. The process is especially applicable to mixtures of acid compounds derived from natural products, e.g. materials such as wood rosin, tall oil and gum rosins or animal-and vegetable-derived fatty acids. Generally, tall oil consists of mixtures of the aliphatic fatty acids and the primarily cycloaliphatic rosin acids. The major chemical components of rosins include abietic and pimaric acids and their various isomers, and linoleic acid plus oleic acid. The naturally occurring fish and vegetable, or seed, oils and fats generally contain the unsaturated fatty acids, i.e. oleic, linoleic and linolenic acids; animal-derived oils include the polyunsaturated arachidonic acid. These natural oils often contain the acids in the form of esters, especially the glycerides.

The preferred acid compounds can be represented by the formula R—(COOR')$_x$; the R and R' groups are preferably hydrocarbon groups or inertly substituted such groups. Any atom or group which does not interfere with the reaction of the present process can be present attached to the R or R' groups. It is only necessary that R have a central carbon-to-carbon structure, straight-chain or branched chain, or alicyclic, which contains at least two ethylenic carbon-to-carbon unsaturated bonds, e.g. —C=C—C=C—. R' can be saturated or unsaturated. Any unsaturation present can be treated by this process in the same manner as the unsaturation in the R group. Inert groups that can be present on the R and R' groups include halogen atom, ether groups and amine or amide groups.

The carboxyl groups can be present as the free acid, i.e. where R' is H, or as an ester, i.e. —COOR', wherein R' is an ester group as defined above. Where a polycarboxylic acid is treated, the acid can be fully or partially esterified.

The number of carboxyl groups, $x$ can be any number greater than 1. Generally, acids having more than five carboxyl groups are not available, and not more than two carboxylic groups is preferred.

Preferably, the alicyclic R groups contain six-carbon atom ring structures. These favor the formation of the stable aromatic structure when tri-unsaturation is present and thus favor the disproportionation reaction desired.

Generally, any polyunsaturated aliphatic or cycloaliphatic carboxylic acid can be treated in accordance with the present invention. Preferably, however, unsaturated carboxylic acids containing from about 5 to about 36 carbon atoms, and preferably from about 8 to about 24 carbon atoms, and usually monocarboxylic acids, are treated. The cycloaliphatic acids include diunsaturated cycloaliphatic acids such as abietic acid, dextro- and levopimaric acids, palustric acid, neoabietic acid, dihydrobenzoic acid, gorlic acid, o-dihydrotoluic acid, 3,4,5 - trimethoxy-dihydrobenzoic acid.

Aliphatic acids that can be treated in accordance with this invention include, for example, 9,12- and 9,11-linoleic acid, linolenic acid, sorbic acid, 4-methylene-2,4-pentadienoic acid, 4-pentyl - 2,5 - heptadienedoic acid, butadiene carboxylic acid, methylsorbic acid, ethylsorbic acid; diallylacetic acid; geranic acid; 2,3,4-decadienoic acid; β-vinylacrylic acid; 2,4-hexadienoic acid, 2,4-decadienoic acid, 2,4-dodecadienoic acid, 10,13-nonadecadienoic acid, 11,14 - eicosadienoic acid, 17,20 - hexacosadienoic acid, hiragonic acid, α- and β-eleostearic acids, punicic acid, linolenelaidic acid, moroctic acid α- and β-parinaric acid, arachidonic acid, timnodonic acid, clupanodonic acid, 6,9, 12,15- and 4,7,10,13-hexadecatetraenoic acids; 6,9,12- and 4,7,10-hexadecatrenoic acids; 9,12-, 6,9- and 7,10-hexadecadienedioic acid, diallylmalonic acid, dimethylene succinic acid, diisopropylidene succinic acid; and dissovaleroglutaric acid.

The esters of the above acids can be treated. Often the naturally occurring fatty acids are obtained as the glycerides, which can be treated directly without preliminary treatment to obtain the free acid. The materials from which the higher molecular weight diunsaturated cycloaliphatic acids are derived include for example rosins, such as tall oil rosin, gum rosin, wood rosin, copals, which include both contemporary and fossil gums.

The fatty acid-containing materials include, in addition to the rosins set forth above, generally the fish or vegetable fats and oils and waxes, such as tall oil, tung oil, linseed oil, castor oil, poppy seed oil, coconut oil, sunflower oil, rapeseed oil, walnut oil, pipe oil, corn oil, olive oil, kelp bass oil, cod liver oil, menhaden oil and salmon oil.

When treating any mixture derived from a naturally occurring material by the process of the present invention, it is not necessary to separate the fatty acids from the cycloaliphatic acids in order to obtain the desired hydrogenation-dehydrogenation, or disproportionation, reactions.

The primary catalyst useful in the process of the present invention is iodine. Other catalysts which generally have the effect of initiating and supporting disproportionation, or dehydrogenation-hydrogenation, reactions of diunsaturated cycloaliphatic acids and polyunsaturated aliphatic acids include for example, sulphur dioxide ($SO_2$) certain of the noble metals, particularly platinum black and palladium black, selenium, sulphur and nickel metal.

Iodine is generally present in proportions of from about .01% to about 3% by weight of the unsaturated acid to be treated. Preferably at least about 0.1% by weight of the catalyst is present and under most circumstances more than about 1% by weight of the catalyst is unnecessary and does not substantially affect the course or speed of the reaction. Although more catalyst can be used, if desired, it would not provide any substantial advantage and would thus be wasteful.

The iodine catalyst, or its reaction products, can be readily removed from the product by sparging with an inert gas such as carbon dioxide, nitrogen, or superheated steam, at the temperature of reaction.

The metal compound co-catalysts are referred to as "activators" because they increase the efficiency and the activity of the catalyst, but by themselves do not have any catalytic activity in this process. Any metal compound is useful which provides metal in an immediately soluble form to the reaction mixture.

Although metals of group 1$a$ of the Periodic Table, i.e. the alkali metals, are generally not useful in this process because they poison the iodine catalyst, the other metals are generally useful. Metals of groups 1$b$, 2$b$, 3, 4, 5$b$, 6$b$, 7$b$ and 8$b$ are especially useful. Metals which have been found to be especially useful include, for example, iron, copper, tin, manganese, lead, aluminum and zinc. Other useful metals include antimony, germanium, cadmium, mercury, nickel, cobalt, chromium, vanadium, titanium, zirconium calcium, tungsten and barium.

The metals can be present in any readily solubilized form. Certain of the more active metals can be added in finely divided elements form that can react quickly with the unsaturated acids, or other acid present in the reaction mixture, to form a soluble compound in situ. Preferably, the metal compound is soluble in both the reaction mixture and the product. For many purposes the small amount of metal present need not be removed. However, if it is desired to remove it, a metal compound which is soluble in the reaction mixture but which precipitates from the product is preferably used.

The metal compound can usefully be a salt, preferably of an organic carboxylic acid. However, any metal compound can be used which contains a negative portion which will not interfere with the reaction and which is soluble in the reaction mixture. The negative portion of the metal compound merely serves as a "solubilizer" for the metal. The metal is preferably present in amounts of from at least about 5 p.p.m. metal content, based on the total amount of feed, and usually at least 10 p.p.m. metal is needed. It is generally not desirable to add more than about 500 p.p.m. metal. It is desirable to avoid any significant reaction between the unsaturated acids treated and the metal compounds. If too much metal is present, this could cause some decrease in acid number. The salt anion merely renders the salt soluble in the reaction mixture. Generally, an organic acid preferably contains at least four carbon atoms. A too high molecular weight will require an excessive amount of the total salt to be added to obtain the desired amount of metal content and is therefore unnecessarily wasteful.

Accordingly, an acid containing more than 36 carbon atoms is unnecessary and optimally the salt acid contains from about 4 to about 24 carbon atoms. Where possible, the metal salt preferably is the salt of an acid which is present in the reaction mixture either in the feed or as one of the reaction products. If the acid is a polyunsaturated acid, it would, of course, be changed in accordance with the hydrogenation-dehydrogenation reaction of this process. Therefore the acid can be either saturated or mono, di, or tri, etc. unsaturated, or can be aromatic. Similarly, salts of either mono or polycarboxylic acids can be used.

The metal salts can be the salts of aliphatic acid such as the fatty acids (saturated or unsaturated), aromatic carboxylic acids or cycloaliphatic carboxylic acids. Examples of such organic acids include linoleic acid, abietic acid, stearic acid, fumaric acid, 2-ethylhexanoic acid, lauric acid, pentadecanoic acid, cyclohexane acetic acid, benzoic acid, maleic acid and succinic acid. Other organic metal compounds which are soluble in the reaction mixture include amine salts such as iron triethanolamine.

Inorganic metal compounds can also be used. These include, for example, metal halides, such as the chlorides, iodides and bromides.

Metals having multiple oxidation states and which can become part of a complex negative portion of a molecule are preferably present in the cationic, or positive portion, of the molecule.

Generally, the various metals do not produce the same reactivity in the reaction process of this invention and indeed it is possible to vary the product obtained by varying the metal salt activator present. The metals can be used alone or in combination. This permits an additional method to easily vary the properties or composition of the final product. For example, by varying the metal, a product having a higher or a lower melting point can be obtained; ferrous or copper salts tend to provide the highest melting point product because they apparently favor the dehydroabietic acid formation. The various metals can be used alone or combination of metals can be added to obtain the desired properties in the final product.

One especially important advantage of the process of this invention is that an extremely light-colored product can be obtained. This has been an especial problem with the treating of rosin materials and the art has undertaken many special treatments to obtain a disproportionated rosin which is as light as is obtained inherently from the process of the present invention. It has been found that a stannous compound or a stannous compound blended with an iron compound, provides the lightest colored product.

For most purposes it is generally not necessary to remove the metal activator from the product. The metal is present in such minute quantities that it does not interfere with the use of the product. If it is desired to remove a soluble metal compound however, any of the conventional methods for doing so would be applicable, including treatment with oxalic acid followed by filtration, centrifugation or other separating means to remove the metal oxalate precipitate.

In the following working examples where rosin acid materials are processed, these materials generally contain abietic acid and the effectiveness of the reaction process is determined at least in part by the proportion of the desired dehydroabietic product in the final product and the decrease in abietic acid compared to the feed. The avoidance of decarboxylation is shown by the test for acid value of the product.

In the following examples, the acid value was determined by the ASTM D 465–59 method; the titrating with standard KOH solution of a 1-gram product sample.

In the following example, the analysis for resin acids was made according to ASTM method D 1585–58T (Wolff method). Alternatively the analysis can be obtained by analyzing for fatty acids according to ASTM method D 1585–58T and for unsaponifiables by ASTM method D 1065–56 and subtracting these values from 100% to obtain the proportion of resin acids present. The latter method may at times be more accurate in view of the fact that the Wolff method makes the assumption that the resin acids have a molecular weight equal to abietic acid which is not always accurate and in certain circumstances can result in a lower value of resin acid content than is actually the case.

EXAMPLES 1–8

To a glass-lined 1 liter reaction vessel was added 500 grams of tall oil rosin acids known as SP-10, premixed with iron resinate co-catalyst in the proportions shown in Table I; iodine was added in the proportions set forth in Table I. The materials were heated to the temperature shown in the table and maintained at that temperature for the period shown in Table I. The heating was discontinued; the reaction mixture was sparged to remove iodine by passing superheated steam through the mixture for fifteen minutes at the reaction temperature. The mixture was then permitted to further cool and was analyzed. The properties of the obtained products are recorded in Table I.

The tall oil rosin feed had the following composition:

Tetrahydrodextropimaric acid _____ 3.7
Dihydroisodextropimaric acid _____ 5.1
Dextropimaric acid _____ 6.4
Dihydroabietic acid _____ 10.4
Tetrahydroabietic acid _____ 7.3
Levopimaric & Palustric acid _____ 5.2
Abietic acid _____ 33.6
Dehydroabietic acid _____ 21.3
Neoabietic acid _____ 1.8
Other components _____ 5.2

The feed had an acid value of 174.0 and a melting point of 59° C. The color of the product in these and subsequent examples was determined by visual comparison with certified color cubes known as the U.S. Rosin Standard and French Rosin Scale, ASTM D–5090–55.

TABLE I

| Example number | Co-cat., p.p.m. | I₂, percent | Temp., °C. | Time, min. | Acid value | Abietic, percent | Dehydro-abietic, percent | M.P., °C. | Color |
| --- | --- | --- | --- | --- | --- | --- | --- | --- | --- |
| Control A | 0 | 0.3 | 225 | 5 | 170.5 | 12.1 | 38.0 | 43.0 | 4A |
| 1 | 10 | 0.3 | 225 | 5 | 173.5 | 4.5 | 43.6 | 49.0 | 5A |
| 2 | 30 | 0.3 | 225 | 5 | 171.8 | 0.0 | 48.5 | 46.0 | 5A |
| Control B | 0 | 0.3 | 225 | 15 | 172.0 | 14.0 | 37.6 | 50.0 | 4A |
| 3 | 10 | 0.3 | 225 | 15 | 169.0 | 1.0 | 53.2 | 47.0 | 5A |
| 4 | 30 | 0.3 | 225 | 15 | 170.6 | 0.0 | 50.8 | 48.0 | 5A |
| Control C | 0 | 0.3 | 275 | 5 | 165.0 | 7.2 | 35.9 | 35.0 | 4A |
| 5 | 10 | 0.3 | 275 | 5 | 166.5 | 2.3 | 35.2 | 31.0 | 5A |
| 6 | 30 | 0.3 | 275 | 5 | 169.5 | 0.0 | 46.8 | 47.0 | 5A |
| Control D | 0 | 0.3 | 275 | 15 | 166.3 | 2.1 | 35.8 | 30.0 | 4A |
| 7 | 10 | 0.3 | 275 | 15 | 163.7 | 0.0 | 41.2 | 31.0 | 5A |
| 8 | 30 | 0.3 | 275 | 15 | 167.5 | 0.0 | 46.1 | 46.0 | 4A |

As shown from the above test data, the acid value of the feed is substantially unchanged in the product. The abietic acid content however is decreased in all cases compared to the Comparative Examples A through D, which did not contain the salt, and decreased to substantially zero in most cases. The dehydroabietic acid content is also substantially increased as a result of the addition of the metal co-catalyst as shown, the reaction time needed to obtain substantially zero abietic acid is no more than five minutes in many cases. This should be compared with the reaction time of an hour and a half or longer required by the prior art to completely disproportionate all of the abietic acid, utilizing iodine alone.

EXAMPLES 9 THROUGH 12

The process of Example 1 was repeated but substituting Telogia Wood rosin for the Tall oil rosin. The Telogia Wood rosin had the following composition:

Acids:
  Pimaric _____ 5.6
  Tetrahydrodextropimaric _____ 0.7
  Dihydroisodextropimaric _____ 0.8
  Dextropimaric _____ 0.7
  Dihydroabietic _____ 1.4
  Tetrahydroabietic _____ 2.7
  Levopimaric & Palustric _____ 7.3
  Abietic _____ 42.6
  Dehydroabietic _____ 9.8
  Neoabietic _____ 6.2
  Isopimaric _____ 16.4
  Other components _____ 5.8

The products obtained were tested and the results set forth in Table II below together with the proportions of iodine and metal co-catalyst present, the temperature of the reaction and the reaction time.

TABLE II

| Example number | Wt. percent catalyst | Activator | Activator, p.p.m. | Temperature, °C. | Time min. | Acid value | M.P., °C. | Dehydroabietic acid, wt. percent | Color | Amount abietic acid, wt. percent |
|---|---|---|---|---|---|---|---|---|---|---|
| 9 | 0.5 | Aluminum resinate | 100 | 235 | 75 | 152.5 | | | 2A | 2 |
| 10 | 0.3 | Zinc resinate | 200 | 250 | 180 | 117 | | | 4A | 0 |
| 11 | 0.5 | Iron resinate | 50 | 235 | 60 | 159 | | | WG | 0 |
| 12 | 0.3 | ___do___ | 150 | 235 | 30 | 157 | 43 | | X | 0 |
| Control F | 0.5 | | 00 | 235 | 288 | 151.7 | 37.0 | 22.2 | 2A | 0 |

The melting points in this and succeeding examples were obtained by the conventional capillary melting point test.

EXAMPLES 13 THROUGH 22

The process of Example 1 was repeated, but substituting for the tall oil rosin used therein a tall oil rosin identified as SP-14, which had the following composition:

Tetrahydrodextropimaric acid _____ 4.1
Dihydroisodextropimaric acid _____ 4.6
Dextropimaric acid _____ 6.0
Dihydroabietic acid _____ 10.6
Tetrahydroabietic acid _____ 8.8
Levopimaric & Palustric acid _____ 4.0
Abietic acid _____ 32.1
Dehydroabietic acid _____ 23.0
Neoabietic acid _____ 1.8
Other components _____ 5.0

The product was evaluated as above and the data is set forth in Table III together with the reaction conditions and proportions of catalyst and activator. Comparing Control F, which contained no metal salt, with the examples of this invention, shows the increase in dehydroabietic acid content obtained.

TABLE III

| Example number | Wt. percent catalyst | Activator | Activator, p.p.m. | Temperature, °C. | Time min. | Acid value | M.P., °C. | Dehydroabietic acid, wt. percent | Color | Amount abietic acid, wt. percent |
|---|---|---|---|---|---|---|---|---|---|---|
| 13 | 0.3 | Iron amine salt | 100 | 235 | 15 | 172 | 48 | 46.8 | WW | 0 |
| 14 | 0.15 | Iron resinate | 75 | 235 | 20 | 174.5 | | 51 | 4A | 0 |
| 15 | 0.3 | ___do___ | 25 | 300 | 3 | 165.2 | | 44.6 | 3A | 0 |
| 16 | 0.3 | ___do___ | 25 | 235 | 15 | 173 | 47 | 43.5 | 6A | 0 |
| 17 | 0.3 | Iron fumarate | 30 | 235 | 10 | 173 | 51 | 45.7 | 4A | 0 |
| 18 | 0.3 | Lead tallate | 100 | 235 | 30 | 169 | | 45.0 | 4A | 0 |
| 19 | 0.3 | Tin resinate | 100 | 250 | 15 | 176 | | 44.0 | 5A | 0 |
| 20 | 0.3 | ___do___ | 100 | 235 | 30 | 172 | 32 | 54.4 | 7A | 0 |
| 21 | 0.3 | Tin oleate | 30 | 235 | 15 | 167 | 48 | 50.4 | 5A | 0 |
| 22 | 0.3 | {Tin oleate / Iron resinate} | 30 / 30 | 235 | 20 | 166 | 47 | 49.6 | 4A | 0 |
| Control F | 0.3 | | | 235 | 50 | 167.8 | a 25 | 35 | 2A | 0 | a Soft.

EXAMPLES 23 THROUGH 29

The process of Example 1 was repeated but using the same tall oil rosin acid mixture. The reaction conditions, catalysts and the results of tests on the product are set forth in Table IV.

TABLE IV

| Example number | Wt. percent catalyst | Activator | Activator, p.p.m. | Temperature, °C. | Time min. | Acid value | M.P., °C. | Dehydroabietic acid, wt. percent | Color | Amount abietic acid, wt. percent |
|---|---|---|---|---|---|---|---|---|---|---|
| 23 x | 0.3 | Iron resinate | 25 | 235 | 15 | 171.5 | 51.5 | 50.2 | 7A | 0 |
| 24 | 0.3 | ___do___ | 25 | 275 | 15 | 164 | 48 | 54 | 3A | 0 |
| 25 | 0.3 | Iron oleate | 25 | 275 | 15 | 166.4 | | 52 | 2A | 0 |
| 26 | 0.3 | Cooper resinate | 10 | 275 | 15 | 161.5 | Soft | 32.9 | 3A | 0 |
| 27 | 0.3 | Manganese resinate | 25 | 275 | 15 | 169 | Soft | | 4A | 0 |
| 28 | 0.3 | {Fe stearate plus Al resinate} | 50 + 50 | 225 | 30 | 170 | | 53.6 | 2A | 0 |
| 29 | 0.3 | FeCl₃ | 30 | 225 | 15 | | | 50.1 | 4A | 0 |
| Control G | 0.3 | | | 235 | 60 | 166.5 | | 36.6 | 2A | 0 |
| | 0.3 | | | 275 | 15 | 166.3 | | 35.3 | | 4.0 | x Rosin distilled prior to disproportionation.

EXAMPLES 30 THROUGH 32

The procedure of Example 1 was repeated but substituting for the tall oil rosin used therein a Portuguese gum having the following composition:

| | |
|---|---:|
| Tetrahydroabietic acid | 2.0 |
| Dihydroisodextropimaric acid | 2.0 |
| Dextropimaric acid | 8.0 |
| Dihydroabietic acid | 1.9 |
| Tetrahydroabietic acid | 4.6 |
| Levopimaric & Palustric acid | 15.5 |
| Abietic acid | 39.5 |
| Dehydroabietic acid | 5.3 |
| Neoabietic acid | 11.4 |
| Isopimaric acid | 2.8 |
| Other components | 7.0 |

The reaction conditions and composition and properties of the product resulting from this process are set forth in Table V.

TABLE V

| Example number | Wt. percent catalyst | Activator | Activator, p.p.m. | Temperature, °C. | Time, min. | Acid value | M.P., °C. | Dehydroabietic acid, wt. percent | Color |
|---|---|---|---|---|---|---|---|---|---|
| 30 | 0.5 | Iron resinate | 30 | 200 | 120 | 160 | 57 | 37.2 | x |
| 31 | 0.3 | Iron fumarate | 30 | 235 | 30 | 162 | | 43.5 | x |
| 32 | 0.3 | Iron resinate | 30 | 235 | 60 | 161 | 43 | 41.6 | 2A |
| Control H | 0.5 | | | 235 | 120 | 160 | Soft | 25 | x |

EXAMPLE 33

The process of Example 1 was repeated but substituting for the tall oil resin used therein a Mexican gum having the following composition:

| | |
|---|---:|
| Pimaric acid | 8.5 |
| Dextropimaric acid | 18.8 |
| Dihydroabietic acid | 4.0 |
| Tetrahydroabietic acid | 2.0 |
| Levopimaric & Palustric acid | 17.1 |
| Abietic acid | 30.0 |
| Dehydroabietic acid | 8.8 |
| Other components | 10.8 |

The process conditions of the reaction and the data on the final product are set forth in Table VI below.

TABLE VI

| Example number | Wt. percent catalyst | Activator | Activator, p.p.m. | Temperature, °C. | Time, min. | Acid value | M.P., °C. | Dehydroabietic acid, wt. percent | Color |
|---|---|---|---|---|---|---|---|---|---|
| 33 | 0.3 | Iron resinate | 30 | 235 | 30 | 150 | 50 | 48 | WW |
| Control I | 0.7 | | | 230 | 120 | 155 | Soft | 30 | WW |

EXAMPLE 34

A castor oil derived linoleic acid composition (Baker—911 SA), which contained 60 wt. percent linoleic acid was treated.

The above linoleic acid composition was mixed with 100 p.p.m. iron stearate in an open glass-lined vessel and mixed with 0.3% iodine and heated to 235° C. The mixture was maintained at 235° C. for approximately 60 minutes at which time heating was discontinued and the material was sparged with carbon dioxide for approximately 15 minutes to remove the iodine.

The product was analyzed and found to contain only a trace of linoleic acid and showed a substantial increase of oleic type acids to about 81%.

EXAMPLES 35–42

Example 34 is repeated but substituting the following acids for the Baker-911 SA and carrying out the process at the temperature indicated in Table VII.

TABLE VII

| Example number | Acid | Temperature, °C. |
|---|---|---|
| 35 | Dimethylene succinic acid | 210 |
| 36 | β-Vinyl acrylic acid | 200 |
| 37 | Sorbic acid | 200 |
| 38 | Arachidonic acid | 235 |
| 39 | Diallylmalonic acid | 280 |
| 40 | 7,10-hexadienedioic acid | 235 |
| 41 | 4,7,10,13-hexadecatetraenoic acid | 235 |
| 42 | Ethylsorbic acid | 200 |

In each example there is a substantial decrease in the degree of unsaturation in the product compared to the acid treated.

EXAMPLE 43

The process of Example 1 is repeated but substituting the acids shown, and carrying out the reactions at the temperature shown, in Table VIII.

TABLE VIII

| Example number | Acid | Temperature, °C. |
|---|---|---|
| 43 | Dihydrobenzoic acid | 235 |
| 44 | o-Dihydrotoluic acid | 250 |

In both of the above examples there is a substantial amount of benzoic acid and toluic acid formed, respectively.

With reference to the above description the patentable embodiments of the present invention are as follows:

1. A process for decreasing the ethylenic unsaturation of a polyunsaturated aliphatic carboxylic acid or a diunsaturated cycloaliphatic carboxylic acid without decarboxylating or otherwise degrading the material, the process comprising dispersing into such ethylenically polyunsaturated aliphatic acid compound or ethylenically diunsaturated cycloaliphatic acid compound, to be treated, iodine disproportionation catalyst and an activator comprising at least one metal compound soluble in the acid, the metal being nonpoisonous to the iodine catalyst, and heating the acid compound.

2. The process of claim 1 wherein the metal compound is the salt of an organic carboxylic acid.

3. The process of claim 1 wherein after heating is discontinued, the iodine is removed by sparging with a gas inert to the reactants of this process.

4. The process of claim 3 wherein the inert gas is superheated steam.

5. The process of claim 1 wherein the iodine is present in an amount of from about 0.01 to about 3 percent by wt. of the unsaturated acid compound being treated.

6. The process of claim 1 wherein the metal compound is present in an amount of from about 5 to about 500 p.p.m. by wt. of metal of total material present.

7. The process of claim 1 wherein the metal compound is a salt of a metal selected from the group consisting of barium calcium and the metals of groups 1b, 2b, 3, 4, 5b, 6b, 7b and 8b of the Periodic Table.

8. The process of claim 1 wherein the metal compound is a salt of a metal selected from the group consisting of iron, copper, tin, zinc, aluminum, lead and manganese.

9. The process of claim 8 wherein the metal is tin.

10. The process of claim 8 wherein the metal is iron.

11. The process of claim 1 wherein the reaction mixture is heated to a temperature in the range of from about 175° to about 300° C.

12. The process of claim 1 wherein the unsaturated acid compound to be treated has the formula $R-(COOR')_x$ wherein R is a polyunsaturated aliphatic group or a diunsaturated cycloaliphatic group, R' is hydrogen, R or an inert organic group and $x$ is an integer equal to at least one.

13. The process of claim 12 wherein R is a hydrocarbon group containing at least two ethylenically unsaturated carbon-to-carbon linkages and containing from about 5 to about 36 carbon atoms.

14. The process of claim 13 wherein R' is hydrogen.

15. The process of claim 14 wherein $x$ is a number from one to about four.

16. The process of claim 1 wherein the metal salt is the salt of a hydrocarbyl carboxylic acid wherein the hydrocarbyl group is selected from the group consisting of aliphatic, cycloaliphatic and aromatic groups.

17. The process of claim 16 wherein the metal salt is the salt of an acid being treated.

18. The process of claim 1, wherein the unsaturated acid compound to be treated is a rosin acid.

19. The process of claim 18 wherein the acid compound to be treated comprises abietic acid.

20. The process of claim 1, wherein the ethylenically polyunsaturated aliphatic acid compound to be treated comprises a fish oil or a vegetable oil.

21. The process of claim 1, wherein the ethylenically polyunsaturated aliphatic acid compound to be treated comprises linoleic acid.

References Cited

UNITED STATES PATENTS

| | | | |
|---|---|---|---|
| 2,503,268 | 4/1950 | Hasselstrom et al. | 260—106 |
| 3,377,334 | 4/1968 | McBride et al | 260—97.5 |
| 2,311,386 | 2/1943 | Hasselstrom | 260—97.5 |
| 3,373,020 | 3/1968 | Tomanek et al. | 260—105 |

DONALD E. CZAJA, Primary Examiner

W. E. PARKER, Assistant Examiner

U.S. Cl. X.R.

260—101, 409, 514 R, 514.5, 526 N, 537 N